Patented Aug. 22, 1944

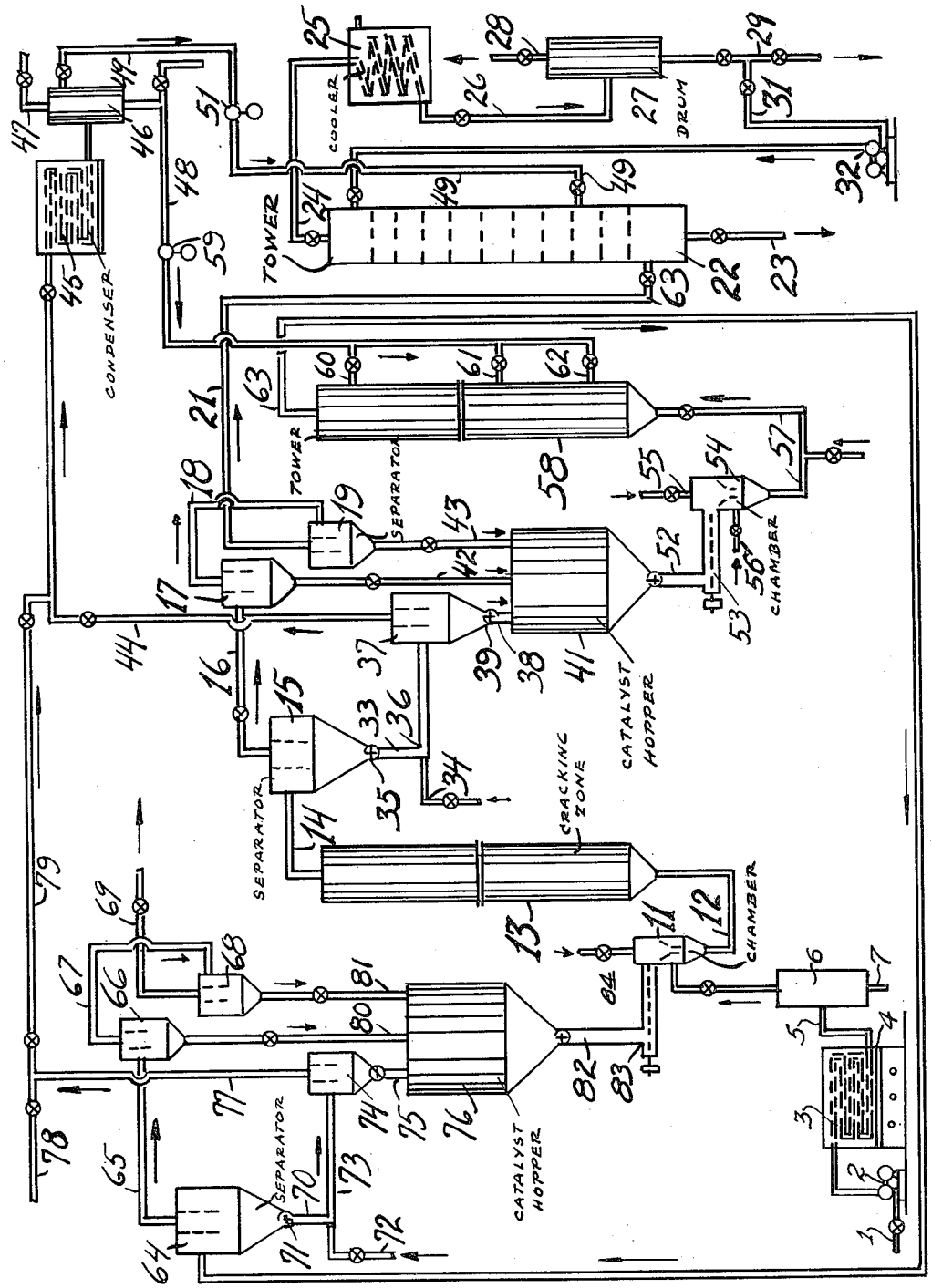

2,356,680

UNITED STATES PATENT OFFICE 2,356,680

CATALYTIC REACTION

Joseph V. Marancik, Roselle, and Edwin J. Gohr, Summit, N. J., assignors to Standard Oil Development Company, a corporation of Delaware Application August 3, 1940, Serial No. 350,510

3 Claims. (Cl. 196—52)

This invention relates to the conversion of hydrocarbon oils and pertains more particularly to a method of and apparatus for the conversion of such oils in the presence of a solid catalytic treating material which is suspended in the oil to be treated.

It has heretofore been proposed to treat hydrocarbon oils in vapor form by suspending a finely-divided treating material in the oil vapors to be processed and passing the suspension of treating material and oil vapors through a treating zone. Following the treating process the treated vapors have been segregated from the treating material.

While the invention in its broader phases will have a more general application to other types of hydrocarbon reactions, such as dehydrogenation. hydration, reforming, alkylation, isomerization, polymerization and the like, it finds particular application in processes for catalytic cracking of hydrocarbon oils wherein a cracking catalyst in finely-divided state is suspended in the oil vapors to be cracked and the resulting suspension passed through a cracking zone. Following the cracking treatment the finely-divided catalyst is separated from the cracked vapors and the vapors are then fractionated to separate a motor fuel fraction therefrom.

In practical operations of this character efficient separation of the cracked products from the finely-divided catalyst cannot be normally accomplished in a single separator such as, for example, a cyclone separator. As a result it has been a practice to pass the suspension successively through a number of such separators arranged in series.

The catalyst after being segregated from the cracked products according to the above procedure is subjected to a purging treatment to remove adsorbent hydrocarbon constituents remaining on the catalyst after passing through said separators. This purging treatment can be accomplished, for example, by contacting the catalyst so separated with an inert stripping gas such as steam or spent combustion gases. Following the purging treatment the catalyst is regenerated to remove non-volatile, cokey deposits which accumulate on the catalyst and which normally tend to reduce the activity thereof. This regeneration may be accomplished by passing an oxdizing gas in contact with the catalyst at a temperature sufficient to burn said carbonaceous deposits therefrom. In many cases during the regenerating treatment it is desirable to regulate the temperature to avoid permanently impairing the activity of the catalyst. The catalyst after being regenerated is then returned to the cracking zone where it is utilized to further crack hydrocarbon oils.

According to one mode of operation the purging of the catalyst between the cracking and regenerating treatment has been accomplished by suspending the catalyst to be purged in the stream of inert gas and then separating the inert gas and reaction products contained therein from the catalyst by means of a suitable separator such as a cyclone separator.

When operating in this manner, it has been the practice to combine the purging gas and residual hydrocarbon vapors contained therein with the main stream of cracked products initially separated from the cracking catalyst and before said stream passes to the final separators so that these separators can be employed to remove the last traces of catalyst from the stripping gas. This practice, however, is subject to certain disadvantages. In some cases the recombining of the stripping gas with the reaction products passing to the final separators for separating the cracked products from the catalyst has interfered with the proper functioning of said separators and reduced the efficiency thereof. In all the cases the presence of a relatively large volume of inert stripping gases requires the provision of larger fractionating or rectifying equipment for fractionating the cracked products to recover the motor fuel distillate.

The primary object of the present invention is to provide an improved process of the type above described which will overcome the disadvantages heretofore mentioned.

Another object of the invention is to provide an improved process for cracking hydrocarbon oils which will require a smaller fractionator for a plant of given oil capacity and which will function more effectively and efficiently.

Other objects and advantages of the invention will be apparent from the detailed description hereinafter in which reference will be made to the accompanying drawing which is a diagrammatic illustration of an apparatus in which the principles of the invention have been embodied.

For illustrative purposes the invention will be described with reference to the catalytic cracking of hydrocarbon oils, it being understood that the invention in its broader phases will have a more general application as previously pointed out.

Referring to the drawing, the reference character I designates a charge line in which the oil to be cracked is introduced into the system. The oil introduced into the system through line 1 is forced by means of pump 2 through a preheating coil 3 located in furnace 4. The oil during its passage through the heating coil 3 is preheated to a temperature sufficient to vaporize a substantial portion of the oil. The heated products from the heating coil 3 then pass through line 5 to a separator 6 in which vapors separate from unvaporized residue. The unvaporized residue is removed from the bottom of the separator 6 through line 7.

The oil vapors liberated in the separator 6 pass overhead through line 8 to a dispersing chamber 11 in which the cracking catalyst in finely-divided state is suspended in the oil vapors to be cracked. The cracking catalyst may be naturally active or activated clays or synthetic gels comprising silica and alumina or silica and magnesia. These types of cracking catalysts are mentioned purely for purposes of illustration as it will be understood that the invention applies to any type of finely-divided solid catalyst employed for this purpose.

The resulting suspension of oil vapors and finely-divided catalyst formed within the dispersion chamber 11 is passed through line 12 to a suitable cracking zone 13 which has been illustrated in the form of an elongated vertical tower. It will be understood that the cracking apparatus may be of any suitable type such as a tower, baffle chamber, tubular coil, or the like capable of maintaining the powdered material in suspension within the oil vapors.

The amount of catalyst introduced into the oil vapors in the dispersion chamber 11 will vary over a wide range depending upon the type of catalyst employed, the nature of the feed stock, the amount of conversion desired, temperature of the reaction zone, and other factors. When cracking clean gas oils employing activated clays of the type known as Super Filtrol, the amount of catalyst may range, for example, between .5 to 10 parts of catalyst per part of oil by weight.

The suspension of oil vapors and catalyst passing through the cracking zone 13 is maintained at the desired reaction temperature, such as, for example, from 700° F. to 1000° F. This heat may be supplied by superheating the oil vapors passing to the dispersion chamber 11 or supplying additional heat if desired through the catalyst introduced into the dispersion chamber or by heating the cracking chamber in any suitable manner. The suspension of oil vapors and catalyst is maintained within the cracking zone for a period sufficient to obtain the desired conversion. In practical operations it is desirable to obtain upwards of 30% conversion of the oil vapors into motor fuel during a single passage of the oil through the cracking zone.

The suspension of oil vapors and catalyst after passing through the cracking zone 13 is transferred through line 14 to an initial separator 15 for segregating the bulk of the powdered catalyst from the cracked products. The separator 15 may be any suitable construction adapted for the segregation of solids from gases such as, for example, a cyclone separator.

Cracked products from the initial separator 15 still containing entrained catalyst pass through line 16 to a second separator 17 for further purification. The cracked products from the second separator 17 may be passed through line 18 to a final separator 19 for further purification. The cracked products from the final separator 19 may then pass through line 21 to a fractionating tower 22 wherein the vapors are fractionated to condense insufficiently cracked constituents. Condensate formed in the fractionator 22 may be withdrawn therefrom through line 23. This condensate may be returned to the cracking zone for further cracking treatment or otherwise utilized in manners outside of the scope of the present invention.

Vapors remaining uncondensed in the fractionating tower 22 and containing the desired motor fuel distillate are removed overhead from the fractionator through line 24 and may be passed to a condenser 25 wherein the motor fuel fraction is condensed. Products from the condenser 25 then pass through line 26 to a suitable receiver 27 wherein the distillate formed in the condenser 25 is separated from residual gases formed in the process. Residual gases separated in the receiver 27 may be removed therefrom through line 28 and passed to a suitable recovery system (not shown) for removal of gasoline constituents entrained therein according to common practice. The liquid distillate collected in the receiver 27 is removed therefrom by line 29 and may be subjected to any further finishing treatment desired for the production of the final motor fuel product. If desired, a portion of such distillate may be returned to the top of the fractionating tower 22 through line 31 and pump 32 to serve as a reflux medium therefor.

Returning to the initial separator 15, the catalyst separated from cracked products therein is removed from the separator 15 through line 33 and is suspended in a stream of inert stripping gas such as steam introduced through line 34. The line 33 is preferably provided with suitable feeding mechanism such as a star feeder 35 for controlling the rate of feed of the catalyst into the stream of inert gas introduced through line 34. The inert gas introduced into the catalyst through line 34 serves to vaporize and strip the catalyst of volatile hydrocarbon constituents adsorbed or otherwise retained on the catalyst separated in the separator 15. The stream of inert gas and powdered catalyst passes through line 36 to a stripping separator 37 wherein the catalyst is segregated from the stripping gas. The stripped catalyst separated in the separator 37 discharges through line 38 having a suitable valve or feeding mechanism 39 and discharges into the catalyst hopper 41.

Catalyst separated from the main cracked product stream in the second and final separators 17 and 19 is discharged through lines 42 and 43 respectively into the hopper 41. The stripping gas separated from the catalyst in the stripping separator 37 is removed overhead therefrom through line 44.

According to one of the phases of the present invention this stream, rather than being combined with the main cracked product stream, is separately passed to a condenser 45 wherein the steam and volatile hydrocarbon constituents contained in the gas are condensed. Products from the condenser 45 pass to a separator 46 wherein normally liquid hydrocarbon constituents stripped from the catalyst in the stripping separator 37 separate from water formed by condensing the steam employed as a stripping medium. Any catalyst contained in the stripping gas not removed by the stripping separator 37 collects in the water phase in the separator 46 rather than in the oil phase. Normally gaseous constituents remaining uncondensed in the condenser 45 may be removed from the separator 46 through line 47. The water phase separated in the separator 46 and containing a residual portion of catalyst from the stripping separator 37 is removed from the separator 46 through line 48 and is treated as hereinafter described. The oil phase segregated in the separator 46 is removed therefrom by line 49 and may be forced by pump 51 into the fractionating tower 22 where it combines with cracked vapors undergoing fractionation therein.

Referring again to the catalyst hopper 41, the catalyst collected therein is passed through a line 52 to a suitable conveyor such as a screw conveyor 53 which feeds the catalyst into a dispersion chamber 54 wherein the catalyst is dispersed into a stream of regenerating gas containing oxygen for removing or burning the carbonaceous deposits formed on the catalyst during the cracking operation. If desired steam may be introduced into the dispersion chamber 54 through a line 55 for initially dispersing the catalyst into the steam. The regenerating gas which may be air or air diluted with an inert gas such as steam or spent combustion gases is introduced into the dispersion chamber 54 through line 56. The suspension of catalyst and regenerating gas is then passed through line 57 to a regenrating chamber 58 which for illustrative purposes has been shown in the form of a vertical tower similar to the cracking chamber 13. This regenerating chamber may take a number of different forms such as a vertical tower as illustrated, a tubular coil, a baffle chamber, or the like constructed and adapted to maintain the powdered catalyst in suspension within the regenerating gas. During the regenerating process, it is normally desirable to remove heat to prevent the temperature from exceeding the point where the activity of the catalyst is permanently impaired.

According to one phase of the invention, at least a portion of the cooling within the regenerating zone is accomplished by the introduction of water formed by condensing the steam employed for stripping the gas. The steam condensate from the stripping collected in the separator 46 may be passed through line 48 and pump 59 and introduced at spaced points within the regenerating zone such as through branch lines 60, 61 and 62. In this manner residual catalyst contained in the condensate so separated is recombined with the catalyst passing through the regenerating zone so that a full recovery of the catalyst may be realized. The stream of regenerating gas and catalyst after passing through the regenerating zone is transferred through line 63 to a separator 64 of any suitable type such as a cyclone separator for separation of the regenerated catalyst from the regenerating medium. The regenerating gas after having the bulk of the regenerated catalyst removed therefrom in the separator 64 but still containing entrained powederd material is transferred through line 65 to a second separator 66 wherein further purification is accomplished. The gas from the second separator 66 may pass through line 67 to a final separator 68 for further purification of the regenerating gas. The gas from the final separator 68 may be removed therefrom through line 69 and may be passed to a suitable heat recovery system such as a waste heat boiler for the recovery of heat or may be expanded through a turbine in the event the regenerating system is operating under pressure.

Referring again to the separator 64 wherein the bulk of the catalyst is separated from the regenerating gas, the catalyst so separated is discharged through a line 70 and may be fed by any suitable means such as a star feeder 71 into a stream of inert gas such as steam introduced through line 72 for stripping the regenerated catalyst of regenerating gas prior to returning the same to the cracking zone. In many cases the step of stripping the regenerated catalyst of regenerating gases may be omitted. The suspension of stripping gas and catalyst passes through line 73 to a separator 74 wherein the catalyst is segregated from the stripping gas. The catalyst so separated is discharged from the separator 74 through line 75 into a catalyst hopper 76. The stripping gas is removed from the separator 74 through line 77 and may be rejected from the system through line 78 or may be passed through line 79 and merged with the stream of stripping gases in line 44 passing to the condenser 45.

Catalyst separated in the second and final separators 66 and 68 is charged through lines 80 and 81 respectively to the catalyst hopper 76. The catalyst from the hopper 76 may be passed through line 82 to a suitable feeding mechanism such as a screw conveyor 83. This feeding mechanism transfers the catalyst into the dispersion chamber 11 wherein it again is dispersed in the oil vapors to be cracked. If desired the regenerated catalyst may be initially dispersed into a stream of inert gas such as steam introduced into the dispersion chamber through line 84 before contacting with the oil vapors.

Both the cracking and the regenerating sections of the equipment may be operated at substantially the same pressure except for the pressure required to overcome the resistance of the support or the cracking and regenerating sections may be operated under a differential pressure. In most cases it is desirable to operate the cracking section of the equipment under substantially atmospheric pressure. Where higher pressures are employed it is sometimes of advantage to provide sufficient inert gas in the cracking support so that the partial pressure of the oil vapors is substantially atmospheric even though the total pressure may be of a higher order.

Having described the preferred embodiment of the invention, it will be understood that it embraces such other variations and modifications as come within the spirit and scope thereof. What is thereby desired by Letters Patent is:

1. In the catalytic conversion of hydrocarbon oils wherein the catalyst in finely-divided state is suspended in the oil vapors to be converted, the resulting suspension passed through a conversion zone, the finely-divided catalyst containing volatile hydrocarbon oil separated from the vaporous conversion products, the vaporous conversion products subjected to fractional condensation in a fractionating zone to segregate a desired product therefrom, the catalyst segregated from said converted products subjected to regeneration by oxidation to remove non-volatile carbonaceous deposits formed thereon during the conversion treatment; the improvement which comprises treating the catalyst after separation from the conversion products and containing said volatile hydrocarbon oil and prior to regeneration with steam to vaporize volatile oil constituents retained thereon, separating the steam and volatile oil constituents from the catalyst, cooling the steam and volatile constituents to condense the steam and normally liquid oil constituents without intermixing with said vaporous conversion products, separating the steam condensate from the oil condensate and passing said steam condensate to the regenerating zone.

2. The invention defined in claim 1 wherein said catalyst is regenerated by suspending the same in a stream of oxidizing gas and thereafter passing the resulting suspension through a regenerating zone.

3. In the catalytic conversion of hydrocarbon oils wherein the catalyst in finely-divided state is suspended in the oil vapors to be converted, the resulting suspension passed through a conversion zone, the finely-divided catalyst containing volatile hydrocarbon oil thereafter separated from the vaporous conversion products, the conversion products so separated then fractionated to separate a desired product therefrom and wherein the catalyst separated from said conversion products is suspended in a stream of oxidizing gas, the resulting suspension thereafter passed through a regenerating zone maintained at a temperature sufficient to oxidize said carbonaceous deposits and the regenerated catalyst thereafter segregated from the regenerating gas and resuspended in the stream of oil vapors to be converted; the improvement which comprises suspending the catalyst separated from said conversion products before subjecting the same to regeneration in a steam atmosphere to vaporize volatile oil constituents retained thereon, thereafter separating the catalyst from the steam and vaporized oil constituents, condensing said steam and oil constituents without intermixing with said vaporous conversion products, segregating the steam condensate from the oil condensate and passing steam condensate to said regenerating zone as a cooling medium therefor.

JOSEPH V. MARANCIK.
EDWIN J. GOHR.